US010198797B2

(12) United States Patent
Ichikawa et al.

(10) Patent No.: US 10,198,797 B2
(45) Date of Patent: Feb. 5, 2019

(54) APPARATUS CORRECTING SHADING WITHOUT TAKING OPTICAL CHARACTERISTICS INTO CONSIDERATION AND METHOD THEREOF

(71) Applicant: ICHIKAWA SOFT LABORATORY CO., LTD., Chiba-shi, Chiba-ken (JP)

(72) Inventors: Yoshikuni Ichikawa, Chiba (JP); Ryo Tamon, Chiba (JP)

(73) Assignee: ICHIKAWA SOFT LABORATORY CO., LTD., Chiba-shi, Chiba-ken (JP)

( * ) Notice: Subject to any disclaimer, the term of this patent is extended or adjusted under 35 U.S.C. 154(b) by 159 days.

(21) Appl. No.: 15/260,462

(22) Filed: Sep. 9, 2016

(65) Prior Publication Data

US 2017/0069066 A1  Mar. 9, 2017

Related U.S. Application Data

(60) Provisional application No. 62/216,089, filed on Sep. 9, 2015.

(51) Int. Cl.
G06K 9/40 (2006.01)
G06T 5/00 (2006.01)
(Continued)

(52) U.S. Cl.
CPC ............. *G06T 5/008* (2013.01); *G06T 5/006* (2013.01); *G06T 5/50* (2013.01); *H04N 5/217* (2013.01);
(Continued)

(58) Field of Classification Search
CPC .................... G05D 1/0246; G06T 7/00; G06T 2207/10016
See application file for complete search history.

(56) References Cited

U.S. PATENT DOCUMENTS 6,148,118 A * 11/2000 Murakami .............. G06T 11/00
358/450
2001/0033701 A1* 10/2001 Okisu .................... G06T 3/4007
382/284
(Continued)

FOREIGN PATENT DOCUMENTS

JP  2006-121612 A  5/2006
JP  2007-189298 A  7/2007

*Primary Examiner* — Vu Le
*Assistant Examiner* — Guillermo M Rivera-Martinez
(74) *Attorney, Agent, or Firm* — Renner, Kenner, Greive, Bobak, Taylor & Weber

(57) ABSTRACT

An image processor has a gap amount detector which detects an amount of gap between a reference image and a comparative image, a first shading change rate detector which detects a shading change rate on a circumference which is away from a center of the reference image or comparative image by the gap amount, a second shading change rate detector which detects shading change rates within each area increased by the gap amount from the center of the reference image or comparative image until shading change rates within an area up to an edge of the reference image or comparative image are detected, and a shading corrector which generates a pixel value corrected in shading with respect to each pixel in the reference image based on the shading change rates detected by the first shading change rate detector and second shading change rate detector.

9 Claims, 9 Drawing Sheets

(51) Int. Cl.
 *G06T 5/50* (2006.01)
 *H04N 5/217* (2011.01)
 *H04N 5/357* (2011.01)
(52) U.S. Cl.
 CPC . *H04N 5/3572* (2013.01); *G06T 2207/10024* (2013.01)

(56) References Cited

U.S. PATENT DOCUMENTS

| | | | | |
|---|---|---|---|---|
| 2004/0206882 | A1* | 10/2004 | Banks | A61B 5/0059 250/201.2 |
| 2007/0177797 | A1* | 8/2007 | Smith | G06K 9/4661 382/164 |
| 2009/0167959 | A1* | 7/2009 | Nakamura | H04N 19/56 348/699 |
| 2010/0097504 | A1* | 4/2010 | Nakano | H04N 5/3572 348/251 |
| 2012/0242790 | A1* | 9/2012 | Sandrew | H04N 13/0257 348/43 |

* cited by examiner

APPARATUS CORRECTING SHADING WITHOUT TAKING OPTICAL CHARACTERISTICS INTO CONSIDERATION AND METHOD THEREOF

CROSS REFERENCE TO RELATED APPLICATIONS

This application is based upon and claims the benefit of priority from the prior U.S. Provisional Patent Application No. 62/216,089 filed on Sep. 9, 2015, the entire contents of which are incorporated herein by reference.

FIELD

The present invention relates to an image processor and an image processing method for performing shading correction.

BACKGROUND

An image imaged by an imaging device has a characteristic that its peripheral area becomes darker than its central part due to the influence of brightness shading. The brightness shading occurs due to the reduction in peripheral illumination of a lens attached to the imaging device.

As methods for correcting the brightness shading, it has been proposed to previously perform correction based on the information at the time of optical design of the lens, and to perform correction based on an image obtained by shooting a subject which has uniformly of the same color such as an 18% gray card.

Further, in addition to the brightness shading, a phenomenon called color shading is known to cause color unevenness. The color shading occurs since the central part and peripheral area of the imaging device are different from each other in the removal efficiency of near infrared light included in a light source, depending on the difference in the incident angle with respect to an IR (Infrared Radiation) cut filter attached at the front of the imaging device.

The color shading is a serious problem particularly in a compact digital camera and a camera mounted on a smartphone which are subjected to many restrictions on the design of lens and unit. In order to correct the color shading, generally, color shading correction tables corresponding to light sources are previously prepared and the light source at the time of shooting is detected and identified to perform correction by selecting a color shading correction table corresponding to the light source.

Since the respective imaging devices do not necessarily have the same optical properties and electrical characteristics, it is difficult to correct the brightness shading and color shading as previously expected. For example, since the brightness shading differs depending on the assembly error etc. in the lens attached to the imaging device, it is not easy to inspect and adjust the lens of every imaging device.

Further, the IR cut filter is provided with an absorption type and a reflection type. In the absorption type, a large amount of near infrared light is removed on the periphery of the imaging device at a large incident angle, by which blue becomes deeper on the periphery. On the other hand, in the reflection type, near infrared light is not removed at a large incident angle, by which red becomes deeper on the periphery. Thus, the color shading changes depending on the relationship between the incident angle and the type of IR cut filter attached to the imaging device. Further, in order to correct the color shading, it is necessary to identify the light source first to use a correction table correctly reflecting the optical spectrum of the light source. At this time, under the environment where a plurality of light sources exist, it is a likely to select an incorrect color shading correction table, because it is difficult to identify a correct light source.

Further, when the light source is unknown, it is likely to select a color shading correction table covering a similar color and a greatly different optical spectrum by mistake.

Further, since the conditions of incident light change depending on aperture and zooming, it is difficult to appropriately correct the brightness shading and color shading when a camera having the imaging device enables the user to adjust the aperture, focal length, etc. of the lens.

The present invention has been made in view of the above problems, and the object thereof is to provide an image processor and an image processing method for performing shading correction with high accuracy by a technique as simple as possible.

SUMMARY OF THE INVENTION

According to one disclosure, an image processor has:

a gap amount detector to detect an amount of gap between a reference image and a comparative image which are imaged at a same focal length and have imaging areas partially overlapping with each other with a gap therebetween;

a first shading change rate detector to detect a shading change rate on a circumference which is away from a center of the reference image or comparative image by the gap amount, based on a pixel value of a first pixel located at the center of the reference image, a pixel value of a second pixel located at the center of the comparative image, a pixel value of a third pixel in the comparative image corresponding to the first pixel, and a pixel value of a fourth pixel in the reference image corresponding to the second pixel;

a second shading change rate detector to detect shading change rates within each area increased by the gap amount from the center of the reference image or comparative image, based on pixel values in the reference image and pixel values in the comparative image within the area, until shading change rates within an area up to an edge of the reference image or comparative image are detected; and a shading corrector to generate a pixel value corrected in shading with respect to each pixel in the reference image based on the shading change rates detected by the first shading change rate detector and second shading change rate detector.

DETAILED DESCRIPTION

Hereinafter, embodiments of the present invention will be explained in detail.

The embodiments of the present invention are provided to automatically correct the shading included in an image imaged by an imaging device. First, the principle of the present embodiment will be explained.

As stated above, the shading includes color shading and brightness shading, and each of the color shading and brightness shading smoothly changes concentrically from the central point of the image. That is, the shading smoothly changes in the radial direction from the center of the image, and becomes uniform in the same radial direction. Further, the shading does not occur at the central point of the image.

Prepared in the present embodiment are a reference image and a comparative image which are imaged at the same focal length and have imaging areas partially overlapping with each other with a gap therebetween. In the present embodiment, a process for detecting shading change rates is performed based on the amount of gap between the reference image and comparative image. Here, the shading change rate represents a ratio of change in shading with respect to the central point of the image. The shading change rate is 1 at the central point of the image, i.e., when image height is 0, the shading change rate becomes smaller as the image height increases, and the shading change rate is 0 when the image height is infinity. In the present embodiment, both of the brightness shading and color shading are called "shading" comprehensively. Thus, the shading change rate in the present embodiment shows the ratio of change in shading including the brightness shading and color shading.

Figure 1A:
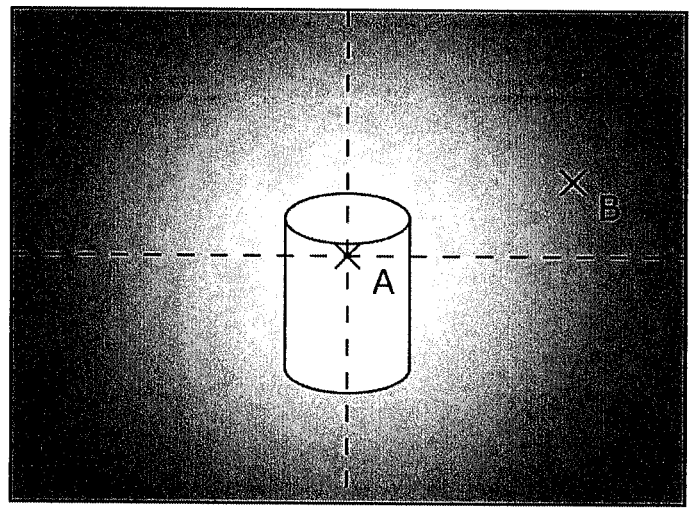
FIG. 1A is a diagram showing a reference image which is shot so that a columnar subject is located at the central point of the image.
Figure 1B:
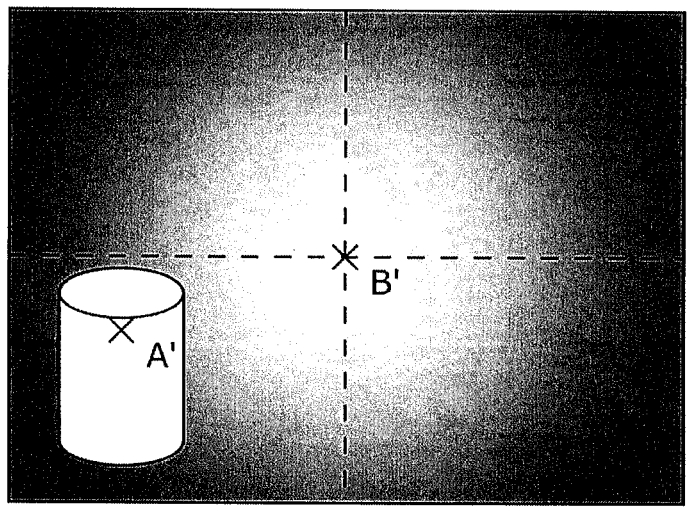
FIG. 1B is a diagram showing a comparative image which is shot so that the same subject as FIG. 1A is shifted from the central point of the image.

FIG. 1A shows a reference image shot so that a columnar subject is located at the central point of the image, and FIG. 1B shows a comparative image shot so that the same subject is shifted from the central point of the image. Each of FIGS. 2, 3A, 3B, 3C, and 3D is a diagram explaining how to detect shading change rates in the reference image.

In FIG. 1A, the central point of the reference image is defined as Point A, and the point which is away from Point A by an image height x is defined as Point B. The comparative image of FIG. 1B is a shifted image shot so that Point B in the reference image is located at the center of the image. Thus, a gap corresponding to image height x occurs between the reference image and the comparative image. In FIG. 1B, the center of the comparative image is defined as Point B' and the position which is away from the central Point B' by the image height x and corresponds to Point A is defined as Point A'. In this way, Point A in the reference image corresponds to Point A' in the comparative image, and Point B in the reference image corresponds to Point B' in the comparative image.

The following explanation is based on the assumption that neither brightness shading nor color shading occurs at Point A at the center of the reference image and Point B' at the center of the comparative image. Further, the reference image has the same shading change rate on a circumference in the same radial distance from the central Point A, and the shading change rate increases as the radius increases. The same can be applied to the comparative image.

The shading change rate is fr(x), fg(x), and fb(x) corresponding to the respective color components. The "x" represents an image height. Since x=0 at Point A at the center of the reference image and at Point B' at the center of the comparative image, fr(0)=1, fg(0)=1, and fb(0)=1. Note that the shading change rate is a real number which is equal to or greater than 0 and equal to or less than 1.

Pixel values at the central Point A and Point B in the reference image and the central Point B' and Point A' in the comparative image can be expressed by the following Formulas (1) to (4).

$$A=(A.R, A.G, A.B) \quad (1)$$

$$B=(B.R, B.G, B.B)=(B'.R*fr(x), B'.G*fg(x), B'.B*fb(x)) \quad (2)$$

$$A'=(A'.R, A'.G, A'.B)=(A.R*fr(x), A.G*fg(x), A.B*fb(x)) \quad (3)$$

$$B'=(B'.R, B'.G, B'.B) \quad (4)$$

Based on Formula (2) and Formula (3), shading change rates fr(x), fg(x), and fb(x) as unknown amounts can be expressed by the following Formulas (5) to (7) or Formulas (8) to (10).

$$fr(x)=A'.R/A.R \quad (5)$$

$$fg(x)=A'.G/A.G \quad (6)$$

$$fb(x)=A'.B/A.B \quad (7)$$

$$fr(x)=B.R/B'.R \quad (8)$$

$$fg(x)=B.G/B'.G \quad (9)$$

$$fb(x)=B.B/B'.B \quad (10)$$

A shading change rate calculated from Formulas (5) to (7) and a shading change rate calculated from Formulas (8) to (10) are obtained. When blown-out highlight or blocked-up shadow occurs in the pixel at least one of Point A, Point A', Point B, and Point B' in the reference image and comparative image, it may be impossible to calculate an effective shading change rate from Formulas (5) to (7) or Formulas (8) to (10). Thus, by calculating two kinds of shading change rates, a shading change rate which is assumed not to suffer from the influence of blown-out highlight and blocked-up shadow can be selected therefrom. Further, when both of the above two shading change rates are effective, the average value of the two shading change rates may be used as the final shading change rate.

Each of the shading change rates fr(x), fg(x), and fb(x) includes both a brightness shading change rate and a color-shading change rate. In various types of shadings, color shading is particularly eye-catching, and thus there may be a need to correct color shading only. Color shading change rates frg(x) and fbg(x) can be expressed by the following Formula (11) and Formula (12).

$$frg(x)=fr(x)/fg(x) \quad (11)$$

$$fbg(x)=fb(x)/fg(x) \quad (12)$$

As clearly shown by Formula (11) Formula (12), red color-shading change rate frg(x) is red shading change rate fr(x) relative to green shading change rate fg(x). Similarly, blue color-shading change rate fbg(x) is blue shading change rate fb(x) relative to green shading change rate fg(x).

By performing shading correction based on the color-shading change rates, it is possible to correct color shading without suffering from the influence of brightness shading. Thus, when wanting to correct color shading only, Formulas (11) to (12) should be used. To the contrary, when wanting to perform shading correction considering the influence of brightness shading, Formulas (5) to (10) should be used. The following, explanation will be given on an example of performing shading correction covering brightness shading and color shading.

The above Formulas (5) to (10) make it possible to obtain the shading change rate on a circumference (circumference cc1 of FIG. 2) which is away from the reference image by the image height x.

Figure 2:
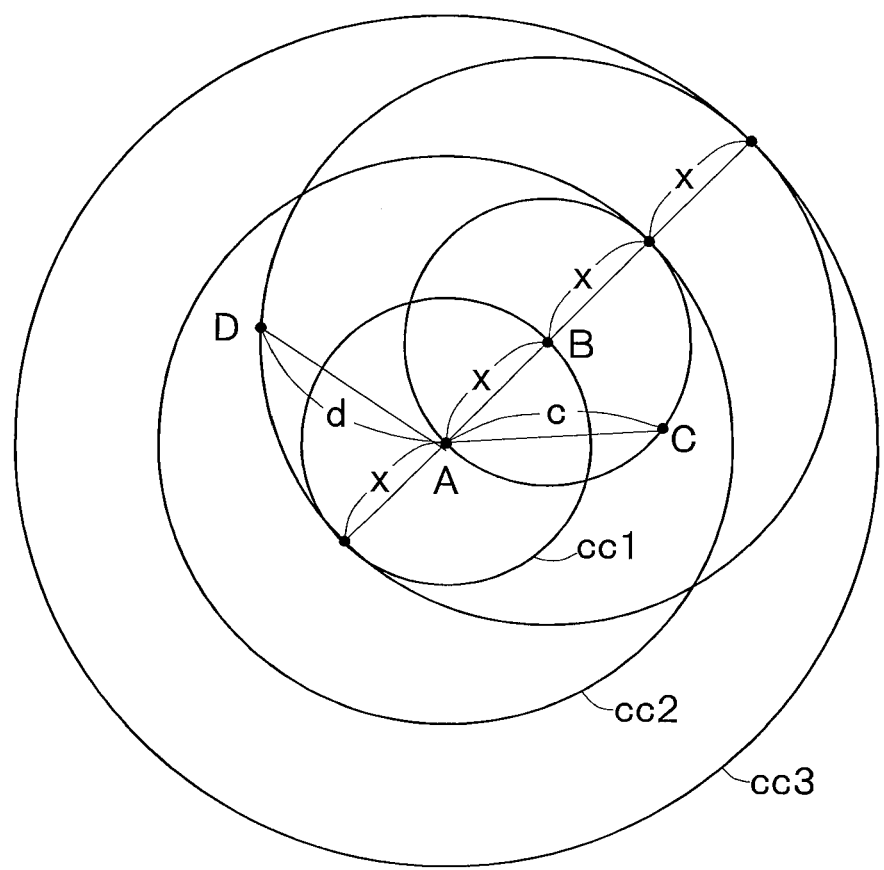
FIG. 2 is a diagram explaining how to detect shading change rates in the reference image.

Next, referring to FIG. 2, consider Point C which is away from Point A at the center of the reference image by an image height c and away from Point B at the center of the optical axis by the image height x. Since Point C is on a circumference of radius x from Point B at the center, a distance c can have an arbitrary value of 0 to 2x. When defining that the actual pixel value at Point C is (C.R, C.G, C.B), and the pixel value at Point C when capturing Point C at the center of the optical axis is (C0.R, C0.G, C0.B), and the shading change rate at Point C is fr(c), fg(c), and fb(c), the actual pixel value at Point C can be expressed by the following Formula (13).

$$C=(C.R,C.G,C.B)=(C0.R*fr(c),C0.G*fg(c),C0.B*fb(c)) \quad (13)$$

Figure 3A:
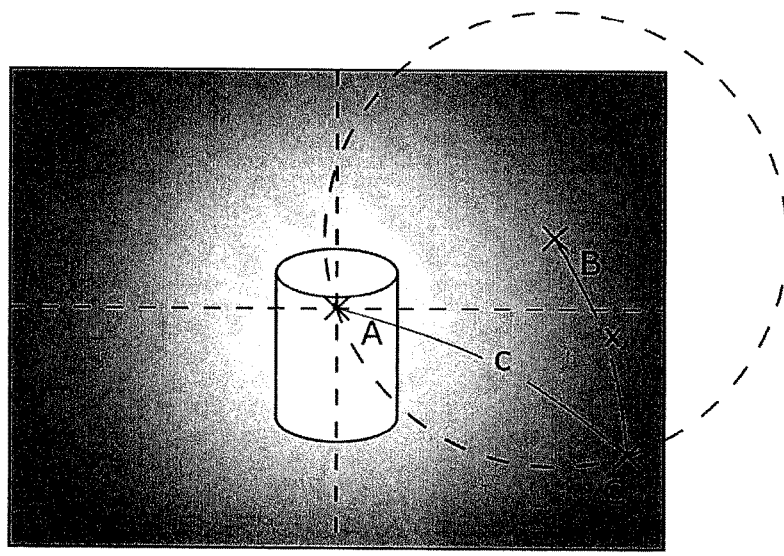
FIG. 3A is a diagram explaining how to detect shading change rates in the reference image.
Figure 3B:
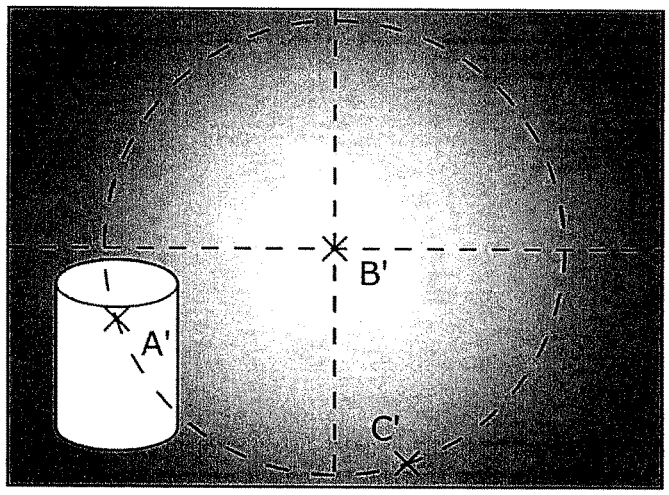
FIG. 3B is a diagram explaining how to detect shading change rates in the reference image.

On the other hand, Point C' in the comparative image corresponding to Point C in the reference image shown in FIGS. 2 and 3A is away from Point B' at the center of the comparative image by a distance x as shown in FIG. 3B, and thus the actual pixel value at Point C' can be expressed by the following Formula (14).

$$C'=(C'.R,C'G,C'.B)=(C0.R*fr(x)),C0.G*fg(x),C0.B*fb(x)) \quad (14)$$

Since the shading change rates fr(x), fg(x), and fb(x) are already obtained by the above Formulas (5) to (10), shading change rates fr(c), fg(c), and fb(c) at Point C can be obtained by the following Formulas (15) to (17).

$$fr(c)=fr(x)*C.R/C'.R \quad (15)$$

$$fg(c)=fg(x)*C.G/C'.G \quad (16)$$

$$fb(c)=fb(x)*C.B/C'.B \quad (17)$$

Since Point C is away from Point A at the center of the reference image by the distance c and the distance c can have an arbitrary value of 0 to 2x, Formulas (15) to (17) make it possible to obtain shading change rates within an arbitrary area from Point A of FIG. 2 to a circumference cc2 of radius 2x.

Figure 3C:
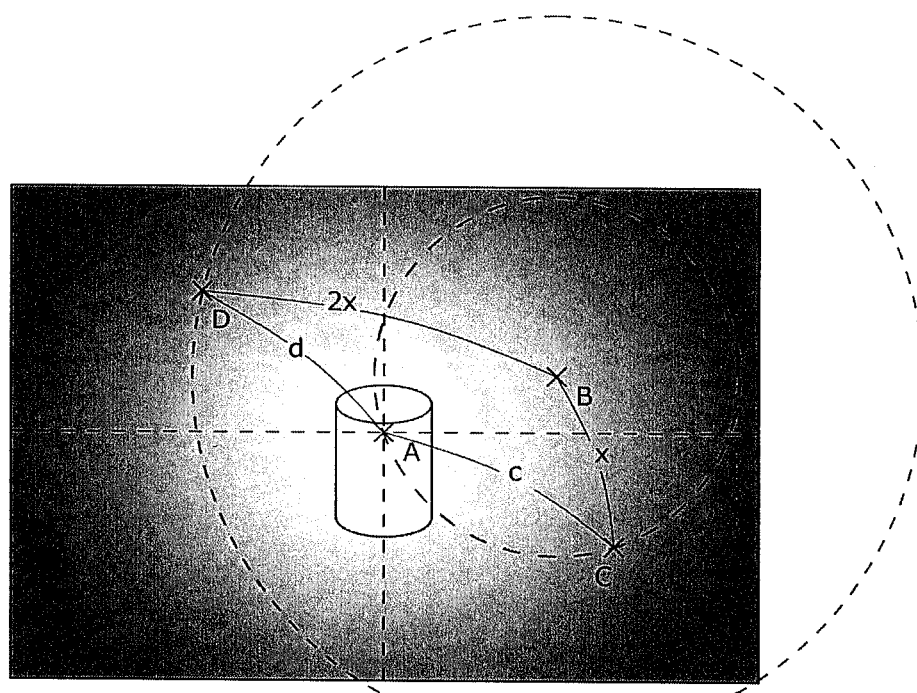
FIG. 3C is a diagram explaining how to detect shading change rates in the reference image.

Next, referring to FIGS. 2 and 3C, consider Point D which is away from Point A at the center of the reference image by a distance d and away from Point B by a distance 2x. Since Point D is on a circumference of radius 2x from Point B at the center, the distance d can have an arbitrary value of x to 3x. When defining that the actual pixel value at Point D is (D.R, D.G, D.B), the pixel value at Point D when capturing Point D at the center of the optical axis is (D0.R, D0.G, D0.B), and the shading change rate at Point D is fr(d), fg(d), and fb(d), the actual pixel value at Point D can be expressed by the following Formula (18).

$$D=(D.R,D.G,D.B)=(D0.R*fr(d),D0.G*fg(d),D0.B*fb(d)) \quad (18)$$

Figure 3D:
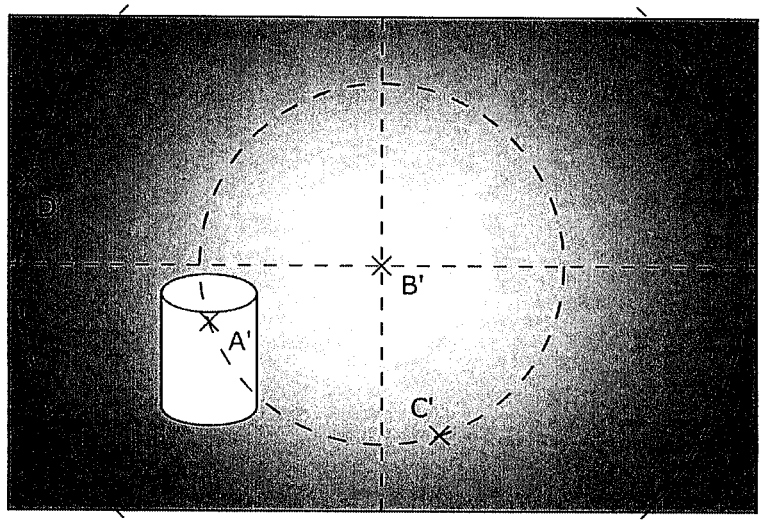
FIG. 3D is a diagram explaining how to detect shading change rates in the reference image.

On the other hand, Point D' in the comparative image corresponding to Point D in the reference image is away from Point B' at the center of the comparative image by a distance 2x as shown in FIG. 3D, and thus the actual pixel value at Point D' can be expressed by the following Formula (19).

$$D'=(D'.R,D'G,D'.B)=(D0.R*fr(2x)),D0.G*fg(2x), D0.B*fb(2x)) \quad (19)$$

Since the shading change rates fr(2x), fg(2x), and fb(2x) are obtained by the above Formulas (15) to (17), shading change rates fr(d), fg(d), and fb(d) at Point D can be obtained by the following Formulas (20) to (22).

$$fr(d)=fr(2x)*D.R/D'.R \quad (20)$$

$$fg(d)=fg(2x)*D.G/D'.G \quad (21)$$

$$fb(d)=fb(2x)*D.B/D'.B \quad (22)$$

Since Point D is away from Point A at the center of the reference image by the distance d and the distance d can have an arbitrary value of x to 3x, Formulas (20) to (22) make it possible to obtain shading change rates within an arbitrary area from the circumference cc1 of radius x from Point A of FIG. 2 to a circumference cc3 of radius 3x.

After that, shading change rates within each area up to a circumference having a radius increased by x from Point A of FIG. 2 are sequentially obtained in a similar way until shading changes rates within an area up to the edge of the reference image or comparative image are obtained.

The above operating procedure makes it possible to obtain shading change rates on a plurality of circumferences having different distances from Point A or Point B' at the center of the reference image or comparative image, respectively. Since the shading change rates on the respective circumferences obtained through calculation are discrete, it is required to perform interpolation on the calculated shading change rates in order to perform shading correction on the pixel values of all the pixels in the reference image and comparative image. Accordingly, in the present embodiment, as described later, a correction curve is generated to express the relationship between the distance from Point A at the center of the reference image and a shading change rate corresponding thereto, and this correction curve is used to perform shading correction on the pixel values of all the pixels in the reference image.

Figure 4:
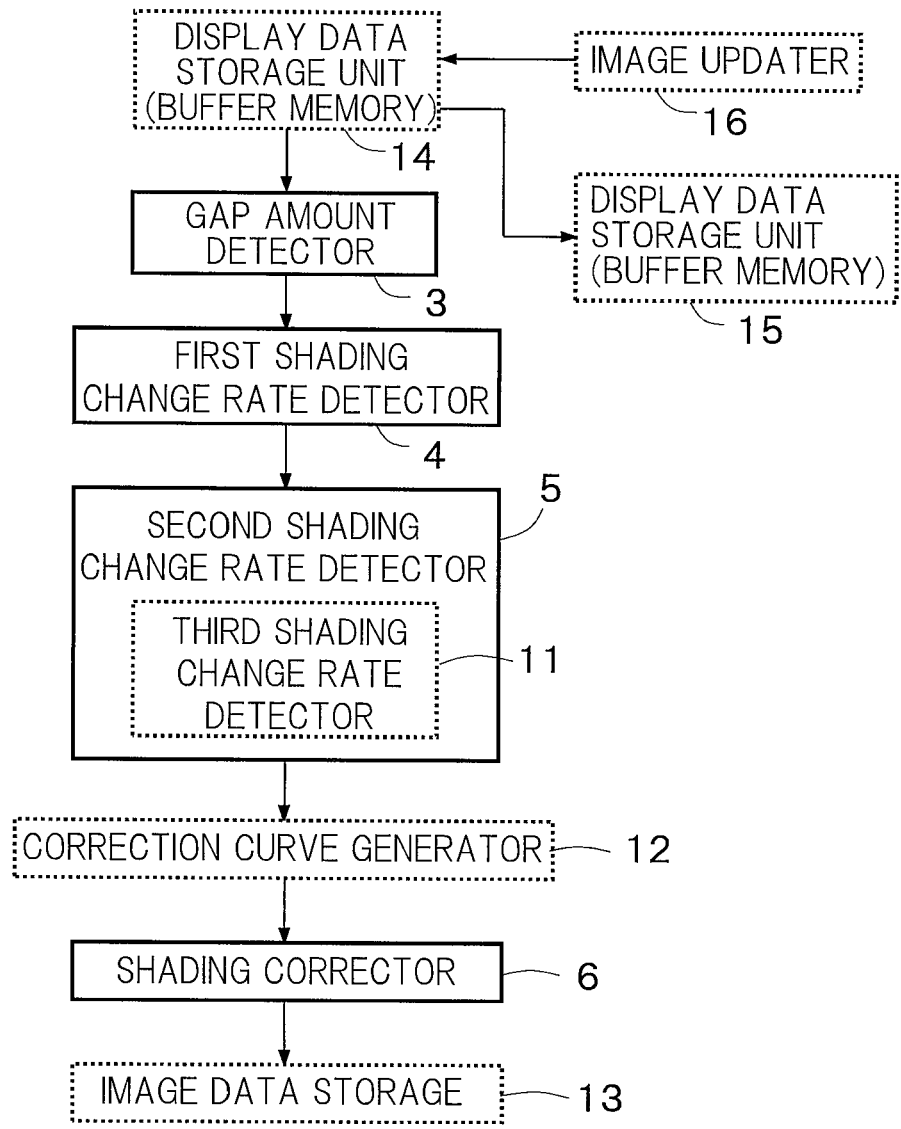
FIG. 4 is a block diagram showing a schematic structure of an image processor 1 according to an embodiment of the present invention.
Figure 5:
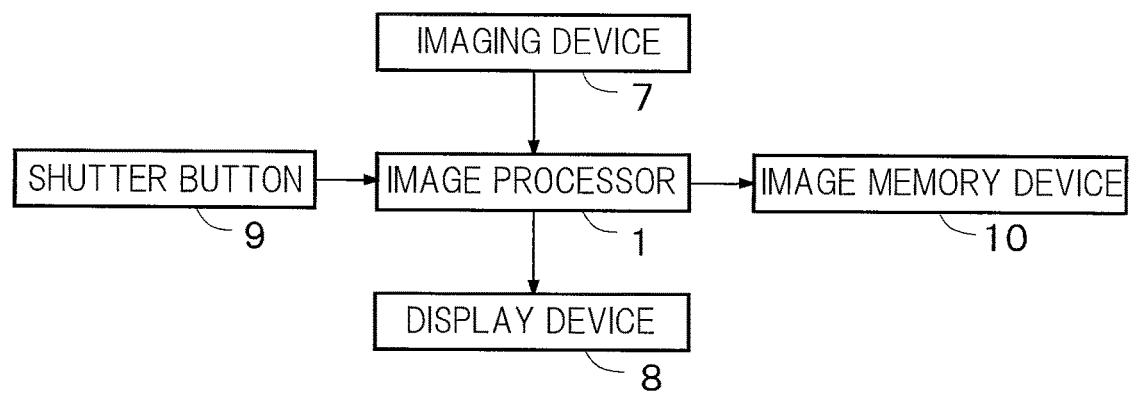
FIG. 5 is a block diagram showing a schematic structure of a camera 2 having the image processor 1 of FIG. 4.

FIG. 4 is a block diagram showing a schematic structure of an image processor 1 according to an embodiment of the present invention, and FIG. 5 is a block diagram showing a schematic structure of a camera 2 having the image processor 1 of FIG. 4. The image processor 1 of FIG. 4 has a gap amount detector 3, a first shading change rate detector 4, a second shading change rate detector 5, and a shading corrector 6. The camera 2 of FIG. 5 has an imaging device 7 such as a CCD sensor and a CMOS sensor, the image processor 1 of FIG. 4, a display device 8, a shutter button 9, and an image memory device 10 such as a memory card. Other components for realizing various functions may be added to the camera 2 of FIG. 5, but those are omitted in FIG. 5. Further, the camera 2 of FIG. 5 may be used solely as a camera, or may be incorporated into various electronic devices such as a cellular phone, a smartphone, and a tablet.

The gap amount detector 3 of FIG. 4 detects the amount of gap between a reference image and a comparative image which are imaged at the same focal length and have imaging areas partially overlapping with each other with a gap therebetween. A plurality of processing algorithms can be applied to the gap amount detector 3. As one of those, the inventor of the present invention made an invention utilizing match-point detection (JP patent No. 4689758). In this case, the gap amount detector 3 compares characteristic pattern images extracted from the reference image and comparative image respectively (characteristic point detector), and detects matching points between the pattern image in the reference image and the pattern image in the comparative image (match detector). Then, the positions of pixels matching with each other in the pattern images are used to detect the amount of gap between the reference image and comparative image. When each of the reference image and comparative image has a plurality of characteristic pattern images, the amount of gap between the reference image and comparative image may be detected by the average value of the pixel position gaps in the respective pattern images.

Instead, when two images (reference image and comparative image) are shot by the camera 2 to have imaging areas intentionally shifted from each other, the gap between the imaging areas may be detected as the gap amount. In this case, the gap amount can be detected relatively easily by attaching an acceleration sensor, a gyroscope, etc. to the camera 2. Note that each of the reference image and comparative image is one frame image which can be displayed on the display device 8.

The first shading change rate detector 4 detects a shading change rate on a circumference which is away from the center of the reference image or comparative image by a gap amount x, based on the pixel value of a first pixel located at Point A at the center of the reference image, the pixel value of a second pixel located at Point B' at the center of the comparative image, the pixel value of a third pixel located at Point A' in the comparative image corresponding to the first pixel, and the pixel value of a fourth pixel located at Point B in the reference image corresponding to the second pixel.

The second shading change rate detector 5 detects shading change rates within each area increased by the gap amount x from the center of the reference image or comparative image, based on pixel values in the reference image and pixel values in the comparative image within the area, until shading change rates within an area up to the edge of the reference image or comparative image are detected.

As shown by a broken line in FIG. 4, the second shading change rate detector 5 may have a third shading change rate detector 11. After the first shading change rate detector 4 finishes detecting the shading change rate, the third shading change rate detector 11 detects shading change rates within an area increased by twice the gap amount x from the center of the reference image, based on the pixel value of a fifth pixel located at Point C which is away from the first pixel in the reference image by a predetermined distance c and away from the fourth pixel by the gap amount x, and on the pixel value of a sixth pixel located at Point C' in the comparative image corresponding to the fifth pixel. In this case, after the third shading change rate detector 11 finishes detecting the shading change rates, the second shading change rate detector 5 detects shading change rates within each area increased by the gap amount x from the center of the comparative image, based on the pixel value of each pixel at a distance increased by the gap amount x from the second pixel in the reference image and the pixel value of a pixel corresponding thereto in the comparative image, until shading change rates within an area up to the edge of the comparative image are detected.

The shading corrector 6 generate a pixel value corrected in shading with respect to each pixel in the reference image based on the shading change rates detected by the first shading change rate detector 4 and second shading change rate detector 5.

As shown by a broken line in FIG. 4, the image processor 1 may have a correction curve generator 12 therein. The correction curve generator 12 generates a correction curve representing a shading change rate with respect to the distance from the center of the reference image or comparative image, based on the shading change rates detected by the first shading change rate detector 4 and second shading change rate detector 5. In this case, the shading corrector 6 generates a pixel value corrected in shading with respect to each pixel in the reference image by using the correction curve.

As shown by a broken line in FIG. 4, the image processor 1 may have an image data storage 13 therein. When an instruction to load an image is given by a push of the shutter button 9 for example, the image data storage 13 stores the pixel values in the reference image corrected by the shading corrector 6 immediately before. If there is no effective reference image corrected by the shading corrector 6, the reference image before being corrected in shading is stored in the image data storage 13. The image data storage 13 of FIG. 4 may be the same as the image memory device 10 of FIG. 5, or may be provided separately from the image memory device 10 of FIG. 5.

As shown by a broken line in FIG. 4, the image processor 1 may have a display data storage unit 14, a display controller 15, and an image updater 16 therein.

The display data storage unit 14 is a buffer memory 14 for temporarily storing the reference image and comparative image. The buffer memory 14 may store three or more images including the reference image and comparative image. The display controller 15 performs control for displaying the reference image in the buffer memory 14 on the display device 8.

When a new image is inputted into the buffer memory 14 after the reference image corrected in shading by the shading corrector 6 is displayed on the display device 8, the image updater 16 updates the reference image and comparative image in the buffer memory 14. When a new image is inputted into the buffer memory 14, the reference image corrected in shading and displayed on the display device 8 is erased. Then, e.g. an image used as the comparative image until then is used as the reference image. In this way, the reference image and comparative image in the buffer memory 14 are occasionally updated, and the updating cycle synchronizes with the display updating cycle of the display device 8.

Figure 6:
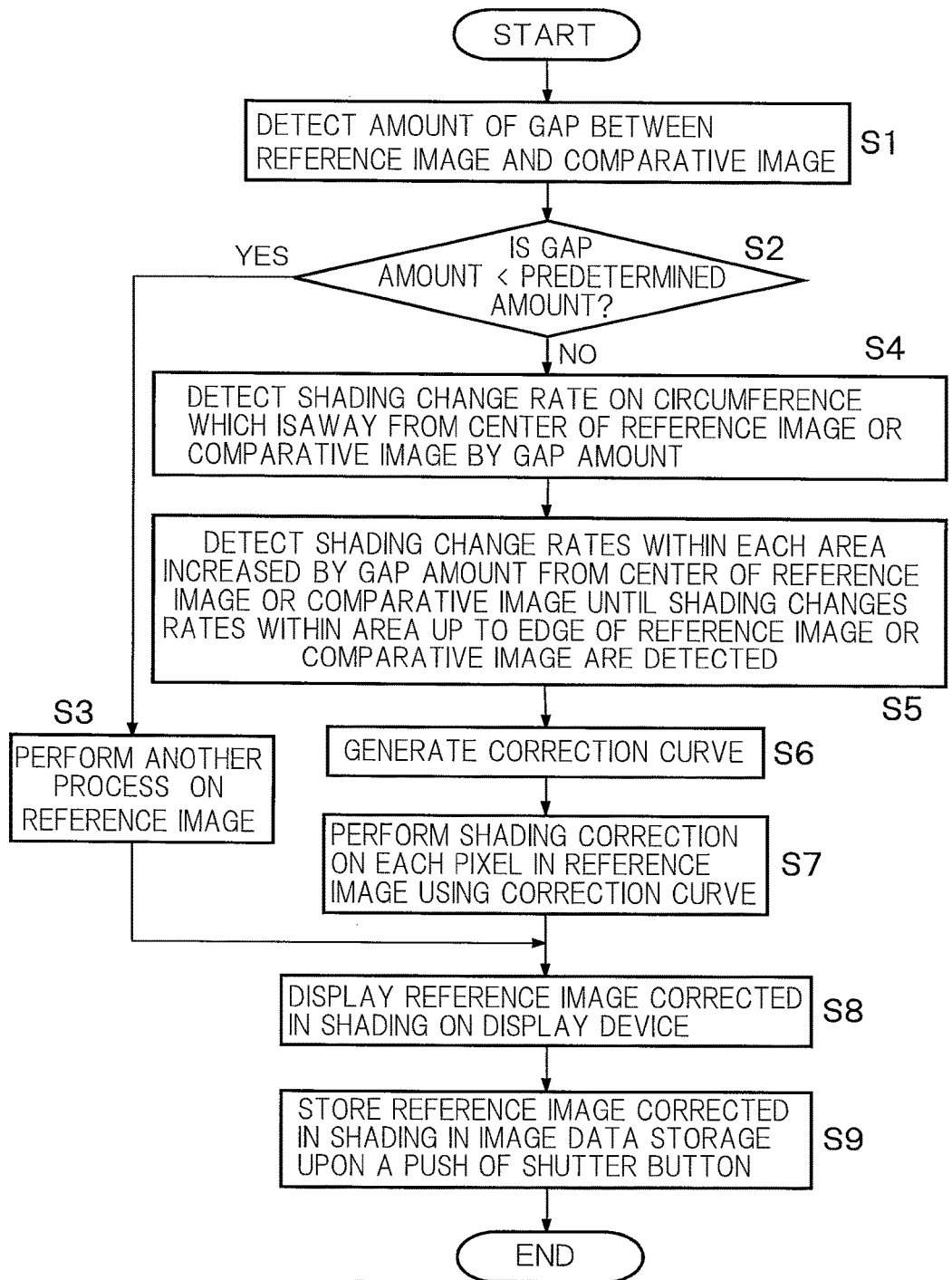
FIG. 6 is a flow chart showing an example of an operating procedure for shading correction performed by the image processor 1 of FIG. 4.

FIG. 6 is a flow chart showing an example of an operating procedure for shading correction performed by the image processor 1 of FIG. 4. First, images imaged by the imaging device 7 are sequentially stored in the buffer memory 14. In the following, for simplification, an image stored at the initial address of the buffer memory 14 is defined as the reference image, and an image stored at the second top address is defined as the comparative image. Images newly imaged by the imaging device 7 are sequentially stored at the addresses subsequent to the second top address of the buffer memory 14.

As described later, when a new image is inputted into the buffer memory 14 after shading correction is performed on the reference image and the reference image corrected in shading is displayed on the display device 8, the image processor 1 erases the reference image, to treat the comparative image as the reference image and treat the new image inputted into the buffer memory 14 as the comparative image.

In the shading correction of FIG. 6, first, characteristic points included in the reference image and comparative image in the buffer memory 14 are extracted to perform match-point detection on the characteristic points. Then, the gap amount detector 3 calculates the displacement between a characteristic point in the reference image and a characteristic point in the comparative image corresponding thereto, and detects the amount of gap between the reference image and comparative image based on the calculated displacement (Step S1).

Next, whether or not the detected gap amount is less than a predetermined amount is judged (Step S2). A small gap amount leads to suffering from the influence of noise easily, and makes it difficult to appropriately generate a correction curve for shading correction. Thus, when the gap amount is judged to be less than a predetermined amount at Step S2, another process is performed on the reference image. Here, in the another process, if a correction curve selected immediately before exists, the correction curve is used to perform shading correction on the reference image. If a correction curve selected immediately before does not exist, shading correction is not performed on the reference image (Step S3). In this case, the reference image is directly displayed on the display device 8 (Step S8).

On the other hand, at Step S2, when the gap amount is judged to be equal to or greater than the predetermined amount, the first shading change rate detector 4 of FIG. 4 detects a shading change rate on a circumference which is away from the center of the reference image or comparative image by the gap amount (Step S4). A concrete process of Step S4 will be described later.

Next, the second shading change rate detector 5 of FIG. 4 detects shading change rates within each area increased by the gap amount from the center of the reference image or comparative image, based on the pixel value of each pixel at the distance increased by the gap amount x from Point A at the center in the reference image and the pixel value of a pixel corresponding thereto in the comparative image, until shading change rates within an area up to the edge of the reference image or comparative image are detected (Step S5). A concrete process of Step S5 also will be described later. At Steps S4 and S5, the shading change rate is detected with respect to each color.

Figure 7:
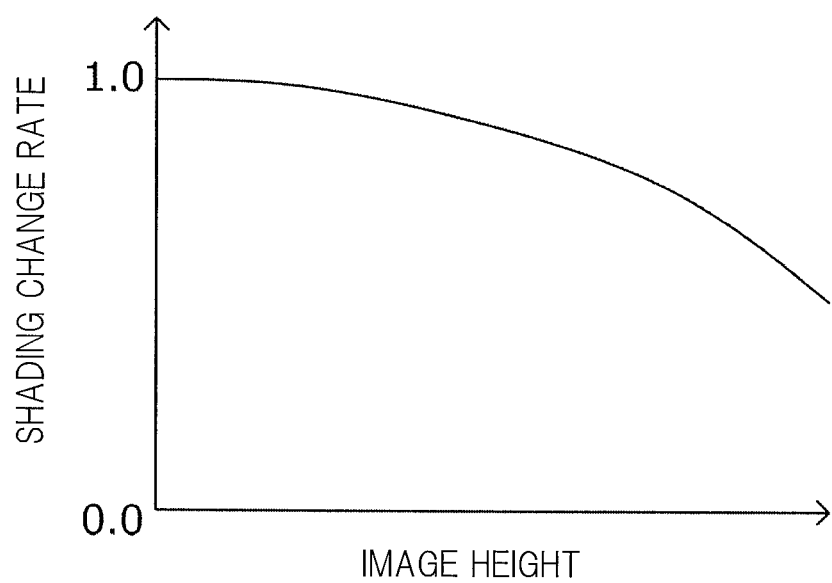
FIG. 7 is a graph showing an example of a correction curve.

Next, based on the shading change rate obtained through the process of Steps S4 and S5, the correction curve generator 12 generates a correction curve (Step S6). FIG. 7 is a graph showing an example of the correction curve. As shown in this drawing, the horizontal axis of the correction curve represents image height, and the vertical axis thereof represents shading change rate. The image height is a distance from the central point of the reference image or comparative image. The correction curve generator 12 performs interpolation on the shading change rates discretely obtained corresponding to the image height through the process of Steps S4 and S5, to generate a correction curve as shown in FIG. 7. Further, the correction curve generator 12 generates a correction curve with respect to each color component of the image.

As shown in FIG. 7, the correction curve is a curve continuously changing in the shading change rate, depending on the image height. Thus, shading change rates at the same image height, i.e., at the same distance from the central point of the reference image, are the same.

Next, the shading corrector 6 performs shading correction on each pixel in the reference image by using the correction curve (Step S7). More specifically, the shading corrector 6 generates a pixel value corrected in shading with respect to each pixel in the reference image on a color component basis by using a correction curve corresponding thereto. Here, pixel values of the pixels at the same distance from the central point of the reference image are corrected based on the same shading change rate.

Next, the reference image corrected in shading at Step S7 is displayed on the display device 8 (Step S8). In this way, the reference image is corrected in shading in real time and displayed on the display device 8 without making the user aware of that. Thus, the image is displayed offsetting the reduction in peripheral illumination of the lens and the influence of the IR cut filter of the imaging device 7.

When the user pushes the shutter button 9 with the reference image corrected in shading being displayed on the display device 8, the reference image corrected in shading is stored in the image data storage 13 or image memory device 10 (Step S9).

After that, when a new image is imaged by the imaging device 7, the process of Step S1 and steps subsequent thereto is repeated.

Figure 8:
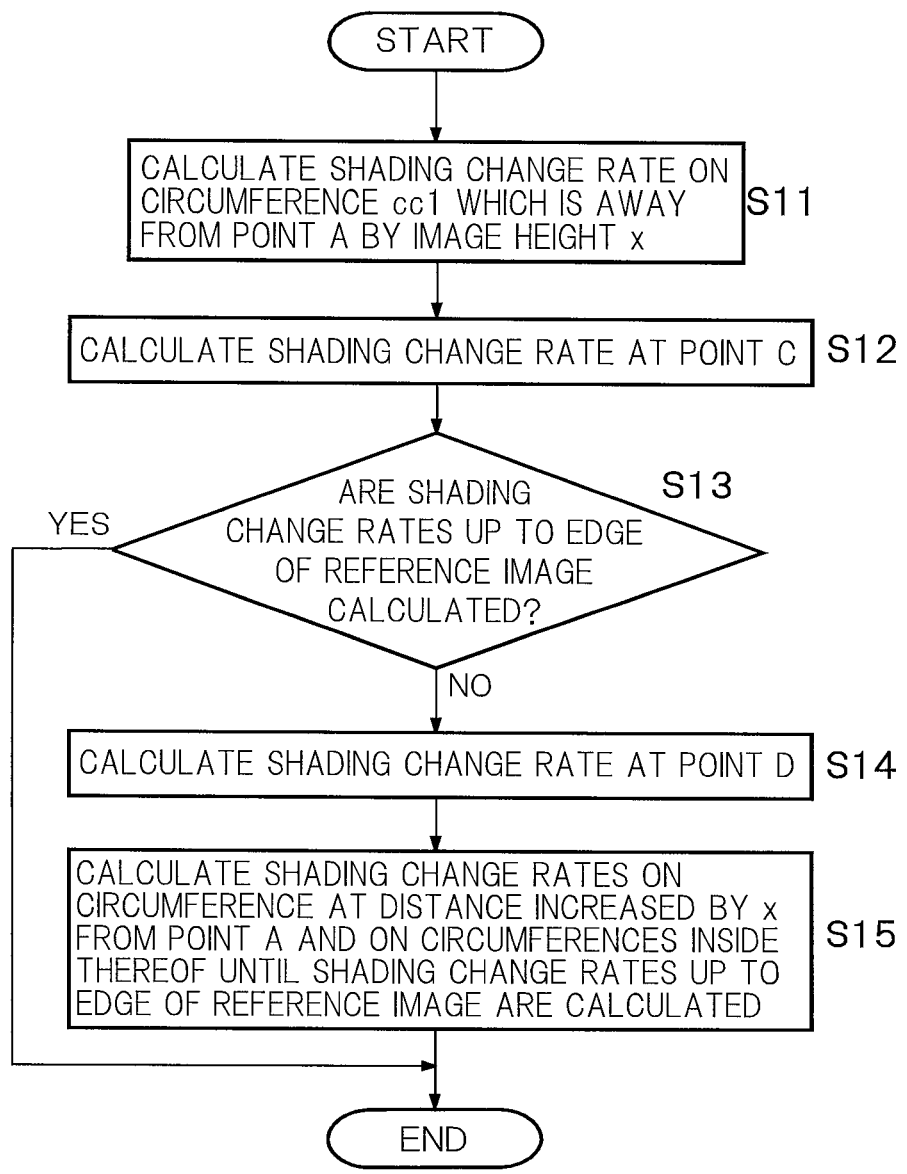
FIG. 8 is a flow chart showing an example of a detailed operating procedure for Steps S4 and S5 of FIG. 6.

FIG. 8 is a flow chart showing an example of a detailed operating procedure for Steps S4 and S5 of FIG. 6. First, pixel values at Point A and Point B in the reference image and values at Point A' and Point B' in the comparative image as shown in FIGS. 1A and 1B are used to calculate the shading change rate on the circumference cc1 which is away from Point A by the image height x based on the above Formulas (5) to (10) (Step S11). The process of this Step S11 corresponds to the process of Step S4 in FIG. 6.

Next, the shading change rate at Point C, which is away from Point A by the distance c and away from Point B by the distance x as shown in FIG. 2, is calculated (Step S12). Since the distance c can have an arbitrary value of 0 to 2x, at Step S12, Point C is set at a plurality of locations different from each other in the distance c to calculate the shading change rates at the respective locations. In this way, shading change rates within the area from Point A at the center of the reference image to the circumference cc2 of radius 2x can be obtained.

Next, judgment is made on whether or not the shading change rates up are calculated to the edge of the reference image (Step S13), and the process of FIG. 8 ends when the shading change rates are calculated up to the edge of the reference image.

If the shading change rates are not calculated up to the edge of the reference image, the shading change rate at Point D, which is away from Point A by the distance d and away from Point B by the distance 2x as shown in FIG. 2, is calculated (Step S14). Since the distance d can have an arbitrary value of x to 3x, at Step S14, Point D is set at a plurality of locations different from each other in the distance d to calculate the shading change rates at the respective locations. In this way, shading change rates within the area from Point A at the center of the reference image to the circumference cc3 of radius 3x can be obtained.

After that, shading change rates on a circumference at a distance increased by x from Point A and those on the circumferences inside thereof are calculated until the shading change rates up to the edge of the reference image are calculated (Step S15). The process of Steps S12 to S15 in FIG. 8 corresponds to the process of Step S5 in FIG. 6.

In this way, in the present embodiment, the reference image and comparative image which are imaged to be shifted from each other are prepared, focusing on the fact that shading including brightness shading and color shading can be regarded as approximately zero at the center of the image and the shading change rate continuously changes depending on the distance from the center. Then, the shading change rate on a circumference which is away from the center of the reference image or comparative image by the gap amount x is detected based on the pixel value of the first pixel located at Point A at the center of the reference image, the pixel value of the second pixel located at Point B' at the center of the comparative image, the pixel value of the third pixel located at Point A' in the comparative image corresponding to the first pixel, and the pixel value of the fourth pixel located at Point B in the reference image corresponding to the second pixel. Next, shading change rates within each area increased by the gap amount from the center of the reference image or comparative image is detected referring to pixel values in the reference image and pixel values in the comparative image within the area, until shading change rates within an area up to the edge of the reference image or comparative image are detected. Based on these detection results, a correction curve is generated to express the relationship between the distance from the center of the reference image and the shading change rate, and this correction curve is used to perform shading correction on each pixel in the reference image. This makes it possible to perform shading correction simply and with high accuracy even when optical properties of the lens and IR cut filter attached to the imaging device 7 and causing shading are not clear.

The image processor 1 according to the present embodiment can be incorporated into various electronic devices such as the camera 2 having the imaging device 7, a cellular phone, a smartphone, and a tablet, which makes it possible to perform shading correction in real time on a shot image displayed on the display device 8 of such an electronic device as a live view. Thus, a shot image free from the influence of shading and of high image quality can be displayed without forcing the user to perform special operation.

At least a part of the image processor 1 explained in the above embodiment may be formed of hardware or software. In the case of software, a program realizing at least a partial function of the image processor 1 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the image processor 1 can be distributed through a communication line (including radio communication) such as the Internet.

Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processor comprising:
a gap amount detector to detect an amount of gap between a reference image and a comparative image which are imaged at a same focal length and have imaging areas partially overlapping with each other with a gap therebetween;
a first shading change rate detector to detect a shading change rate on a circumference which is away from a center of the reference image or comparative image by the gap amount, based on a pixel value of a first pixel located at the center of the reference image, a pixel value of a second pixel located at the center of the comparative image, a pixel value of a third pixel in the comparative image corresponding to the first pixel, and a pixel value of a fourth pixel in the reference image corresponding to the second pixel;
a second shading change rate detector to detect shading change rates within each area increased by the gap amount from the center of the reference image or comparative image, based on pixel values in the reference image and pixel values in the comparative image within the area, until shading change rates within an area up to an edge of the reference image or comparative image are detected; and
a shading corrector to generate a pixel value corrected in shading by multiplying each pixel value in the reference image by the shading change rates detected by the first shading change rate detector and second shading change rate detector.

2. The image processor of claim 1, further comprising:
a third shading change rate detector to detect shading change rates within an area expanded by twice the gap amount from the center of the reference image after the first shading change rate detector finishes detecting the shading change rate, based on a pixel value of a fifth pixel in the reference image which is away from the first pixel by a predetermined distance and away from the fourth pixel by the gap amount, and on a pixel value of a sixth pixel in the comparative image corresponding to the fifth pixel,
wherein after the third shading change rate detector finishes detecting the shading change rates, the second shading change rate detector sequentially detects shading change rates within each area increased by the gap amount from the center of the reference image or comparative image, until shading change rates within an area up to an edge of the reference image or comparative image are detected.

3. The image processor of claim 1, further comprising:
a correction curve generator to generate a correction curve representing a shading change rate with respect to a distance from the center of the reference image or comparative image, based on the shading change rates detected by the first shading change rate detector and second shading change rate detector,
wherein the shading corrector generates a pixel value corrected in shading with respect to each pixel in the reference image by using the correction curve.

4. The image processor of claim 3,
wherein each pixel of the reference image and comparative image has pixel values corresponding to a plurality of color components,
the correction curve generator generates the correction curve with respect to each of the color components, and
the shading corrector generates a pixel value corrected in shading with respect to each pixel in the reference image on a color component basis by using the correction curve corresponding thereto.

5. The image processor of claim 1, further comprising:
a characteristic point detector to detect a characteristic point in the reference image and a characteristic point in the comparative image; and
a match detector to detect matching between the characteristic point in the reference image and the characteristic point in the comparative image,
wherein the gap amount detector detects the gap amount based on positions of the characteristic points in the reference image and comparative image detected by the match detector on whether they match with each other.

6. The image processor of claim 1,
wherein the gap amount detector detects the gap amount based on a gap in a central direction of an optical axis of a camera shooting the reference image and the comparative image.

7. The image processor of claim 1, further comprising:
an image data storage to store the pixel values in the reference image corrected by the shading corrector immediately before an instruction to load an image is given.

8. The image processor of claim 1, further comprising:
a display data storage unit to temporarily store the reference image and the comparative image;
a display controller to control display of the reference image in the display data storage unit on a display device; and
an image updater to update the reference image and comparative image in the display data storage unit when a new image is inputted into the display data storage unit after the reference image corrected in shading by the shading corrector is displayed on the display device.

9. An image processing method comprising:
detecting an amount of gap between a reference image and a comparative image which are imaged at a same focal length and have imaging areas partially overlapping with each other with a gap therebetween;
detecting a first shading change rate on a circumference which is away from a center of the reference image or comparative image by the gap amount, based on a pixel value of a first pixel located at the center of the reference image, a pixel value of a second pixel located at the center of the comparative image, a pixel value of a third pixel in the comparative image corresponding to the first pixel, and a pixel value of a fourth pixel in the reference image corresponding to the second pixel;
detecting a second shading change rates within each area increased by the gap amount from the center of the reference image or comparative image, based on pixel values in the reference image and pixel values in the comparative image within the area, until shading change rates within an area up to an edge of the reference image or comparative image are detected; and
generating a pixel value corrected in shading by multiplying each pixel value in the reference image by the first shading change rate and the second shading change rates.

* * * * *